US012571695B2

(12) United States Patent
Tepsic et al.

(10) Patent No.: US 12,571,695 B2
(45) Date of Patent: Mar. 10, 2026

(54) TORQUE AND ANGLE OF ROTATION DETECTION SYSTEM

(71) Applicant: Kistler Holding AG, Winterthur (CH)

(72) Inventors: Stanko Tepsic, Schorndorf (DE);
Alexander Roshau, Stuttgart (DE);
Tobias Waibel, Schorndorf (DE)

(73) Assignee: Kistler Holding AG, Winterthur (CH)

( * ) Notice: Subject to any disclaimer, the term of this patent is extended or adjusted under 35 U.S.C. 154(b) by 449 days.

(21) Appl. No.: 17/973,869

(22) Filed: Oct. 26, 2022

(65) Prior Publication Data

US 2023/0135927 A1     May 4, 2023

(30) Foreign Application Priority Data

Oct. 28, 2021    (EP) ..................................... 21205296

(51) Int. Cl.
| | |
|---|---|
| *G01L 3/10* | (2006.01) |
| *B62D 6/10* | (2006.01) |
| *F16K 37/00* | (2006.01) |
| *G01L 5/22* | (2006.01) |
| *H02P 6/08* | (2016.01) |

(52) U.S. Cl.
CPC ............... *G01L 3/105* (2013.01); *B62D 6/10* (2013.01); *F16K 37/0075* (2013.01); *G01L 3/101* (2013.01); *G01L 3/108* (2013.01); *G01L 5/221* (2013.01); *H02P 6/085* (2013.01)

(58) Field of Classification Search
CPC ......... G01L 3/105; G01L 3/108; G01L 5/221; G01L 3/101; F16K 37/0075; B62D 6/10; H02P 6/085

USPC ...................................................... 73/862.193
See application file for complete search history.

(56) References Cited

U.S. PATENT DOCUMENTS

| | | | | |
|---|---|---|---|---|
| 5,297,439 A | * | 3/1994 | Tyren | ..................... G01L 3/102 |
| | | | | 73/779 |
| 5,351,555 A | * | 10/1994 | Garshelis | ............. H10N 35/101 |
| | | | | 336/30 |

(Continued)

FOREIGN PATENT DOCUMENTS

| | | | | |
|---|---|---|---|---|
| CA | 2373426 A1 | * | 1/1924 | |
| CH | 710404 A1 | * | 5/2016 | .......... G01D 5/2451 |

(Continued)

OTHER PUBLICATIONS

Lemarquand et al., Magnetic Field Produced by a Tile Permanent Magnet WHose Polarization is Both Uniform and Tangential, Progress in Electromagnetics Research B, vol. 13, 1-20, 2009 (Year: 2009).*

(Continued)

*Primary Examiner* — Stephanie E Bloss
*Assistant Examiner* — Kevin C Butler
(74) *Attorney, Agent, or Firm* — Dority & Manning, P.A.

(57)     ABSTRACT

A torque and angle of rotation detection system is rotatable about an axis of rotation and includes a stator unit separated from a rotor unit by an air gap disposed radially with respect to the axis of rotation. The rotor unit includes strain gauges, dipole magnets and a secondary coil with ferrite elements. The stator unit includes a magnetic field sensor and a primary coil wherein a primary electrical voltage in the primary coil generates a secondary electrical voltage in the secondary coil.

16 Claims, 4 Drawing Sheets

(56) References Cited

U.S. PATENT DOCUMENTS

| | | | | | |
|---|---|---|---|---|---|
| 5,520,059 A | * | 5/1996 | Garshelis | ............... | G01L 3/102 |
| | | | | | 73/862.333 |
| 5,568,048 A | * | 10/1996 | Schroeder | ............. | G01D 5/145 |
| | | | | | 324/252 |
| 5,705,756 A | * | 1/1998 | LeMarquand | .......... | G01L 3/104 |
| | | | | | 340/665 |
| 6,581,480 B1 | * | 6/2003 | May | ........................ | G01L 3/103 |
| | | | | | 73/862.333 |
| 7,183,761 B2 | * | 2/2007 | Watanabe | ............. | G01D 5/202 |
| | | | | | 324/207.16 |
| 8,717,010 B2 | * | 5/2014 | Ausserlechner | ..... | G01R 33/022 |
| | | | | | 324/179 |
| 10,309,855 B2 | * | 6/2019 | Mokhbery | ............. | G01L 3/108 |
| 11,866,187 B1 | * | 1/2024 | Lin | ........................ | H02K 11/04 |
| 2002/0035877 A1 | * | 3/2002 | Tokumoto | ............... | G01L 3/104 |
| | | | | | 73/862.333 |
| 2002/0124663 A1 | * | 9/2002 | Tokumoto | ............... | G01L 3/104 |
| | | | | | 73/862.333 |
| 2005/0184726 A1 | * | 8/2005 | Watanabe | ............. | G01D 5/202 |
| | | | | | 310/68 B |
| 2010/0307218 A1 | * | 12/2010 | Meuter | ................... | G01L 3/108 |
| | | | | | 73/1.09 |
| 2013/0112494 A1 | * | 5/2013 | Aoki | ....................... | G01L 3/104 |
| | | | | | 73/862.331 |
| 2013/0249538 A1 | * | 9/2013 | Oike | ........................ | B62D 6/10 |
| | | | | | 324/207.25 |
| 2015/0171694 A1 | * | 6/2015 | Walsh | .................... | H02K 29/03 |
| | | | | | 310/156.43 |
| 2016/0276871 A1 | * | 9/2016 | Schmitz | ................... | H01F 38/14 |
| 2018/0058969 A1 | * | 3/2018 | Mokhbery | ............. | G01L 3/108 |
| 2018/0154926 A1 | * | 6/2018 | Ohira | .................... | B62D 15/02 |
| 2018/0215047 A1 | * | 8/2018 | Sato | ....................... | G01L 3/1435 |
| 2018/0265125 A1 | * | 9/2018 | Yoshiya | .................. | G01L 5/221 |
| 2020/0292400 A1 | * | 9/2020 | Shibuya | ................ | G01L 3/1435 |
| 2021/0278195 A1 | * | 9/2021 | Close | ................... | G01D 5/2053 |
| 2023/0135927 A1 | * | 5/2023 | Tepsic | ..................... | G01L 3/108 |
| | | | | | 73/862.193 |
| 2024/0356412 A1 | * | 10/2024 | Bender | .................... | H02K 9/19 |

FOREIGN PATENT DOCUMENTS

| | | | | | |
|---|---|---|---|---|---|
| CN | 102386690 | * | 3/2012 | ............... | H02K 1/02 |
| CN | 102386690 A | * | 3/2012 | | |
| CN | 108627293 A | * | 10/2018 | | |
| CN | 110098706 A | * | 8/2019 | ............... | B60K 6/00 |
| CN | 109937345 B | * | 5/2022 | ........... | G01D 5/2046 |
| CN | 116046232 A | * | 5/2023 | ............... | G01B 7/30 |
| CN | 219266413 | * | 6/2023 | ............. | G01R 27/26 |
| CN | 219266413 U | * | 6/2023 | ........... | G01R 31/343 |
| DE | 102009033242 A1 | * | 1/2010 | ............ | G01D 21/02 |
| DE | 102015103823 A1 | * | 9/2016 | ............ | H01F 27/00 |
| EP | 1180665 A2 | * | 2/2002 | ............ | B62D 15/02 |
| EP | 1744126 A1 | * | 1/2007 | .......... | G01D 5/2451 |
| EP | 2450918 A2 | * | 5/2012 | .......... | H01F 7/0284 |
| FR | 3077880 A1 | * | 8/2019 | ............... | G01B 7/30 |
| GB | 2221311 A | * | 1/1990 | ............ | G01L 3/106 |
| JP | H10104094 A | * | 4/1998 | ............... | B62D 5/04 |
| JP | 2002107240 A | * | 4/2002 | | |
| JP | 2007271275 A | * | 10/2007 | | |
| JP | 2009288198 A | * | 12/2009 | .......... | G01L 3/1457 |
| JP | 2011503556 A | * | 1/2011 | ............ | G01L 25/00 |
| JP | 5024648 B2 | * | 9/2012 | | |
| JP | 5623368 B2 | * | 11/2014 | .......... | H01F 7/0284 |
| JP | 5843099 B2 | * | 1/2016 | ............ | G01L 3/104 |
| JP | 2021051098 A | * | 4/2021 | ........... | B25J 13/085 |
| KR | 20100102610 A | * | 9/2010 | ............ | G01L 25/00 |

OTHER PUBLICATIONS

Lemarquand et al., Magnetic Differential Torque Sensor, IEEE Transactions on Magnetics, vol. 31, pp. 3188-3190 No. 6, Nov. 1995 (Year: 1995).*

Mulyaseputra et al., The Ferrite Effect on Magnetic Field Distribution with Two Rotors and One Stator Machine Topology, The Engineering Physics International Conference (EPIC), Procedia Engineering 170, 384-389 2017 (Year: 2017).*

Bradley K., Feasibility of Ferrite Magnet Replacements in Neodymium EV Motors, coursework for PH240, Stanford University, Mar. 28, 2024 (Year: 2024).*

The foreign Office Action for JP application No. 2022-132917, Aug. 29, 2023, 4 pages.

The European Search Report for EP application No. 21205296.3, Apr. 8, 2022, 5 pages.

Kistler Gruppe, KiTorq Rotor, Torque measuring unit (rotor) for a torque measuring flange, Datasheet 4550A000-880e-08.20, Winterthur, Schweiz, 2011-2020, pp. 1-11.

* cited by examiner

TORQUE AND ANGLE OF ROTATION DETECTION SYSTEM

TECHNICAL FIELD

The invention relates to a torque and angle of rotation detection system that includes a rotor unit, a stator unit and strain gauges.

BACKGROUND OF THE INVENTION

Industrial measurement technology serves to detect physical parameters such as a torque, angle of rotation and the like of industrially manufactured products. For example, test stand technology is used for measuring the torque and angle of rotation of rotating components such as internal combustion engines, electric motors, gearboxes, pumps, and the like. In addition, the torque and angle of rotation of rotating components is also measured in chip removing machining of workpieces.

A system for detecting torque and angle of rotation known as KiTorq and documented in the data sheet 4550A_000-880d-08.20 is available from the applicant. KiTorq is considered as prior art for the purposes of the present invention. KiTorq features a rotor unit and a stator unit. The rotor unit is designed as a flange which can be attached to any rotating component via a screw connection. The rotor unit is configured for rotational speeds of up to 20000 min-. The stator unit, on the other hand, is stationary. It is separated from the rotor unit with respect to an axis of rotation by a radial air gap.

The rotor unit comprises strain gauges. The strain gauges comprise a measuring grid and a bridge circuit. When an electrical voltage is applied to the measuring grid, the measuring grid exhibits an electrical resistance. The electrical resistance changes upon expansion or compression of the measuring grid, which change in electrical resistance generates measurement signals in the bridge circuit. In this way, the strain gauges detect the torque that acts onto the rotor unit. The strain gauges detect the torque in a dynamic manner generating up to 10,000 measurement signals per second with a sampling rate of up to 35 kSample. The measurement signals have a resolution of 24 bit.

The rotor unit comprises a plurality of dipole magnets which are spaced apart from each other. The stator unit comprises a magnetic field sensor that measures the magnetic fields of the dipole magnets during rotation of the rotor unit. The system counts the magnetic fields measured, and since the distance between the dipole magnets is known, determines the angle of rotation traveled by the rotor unit therefrom.

The rotor unit comprises a rotor antenna and the stator unit comprises a stator antenna for the transmission of the measurement signals from the rotor unit to the stator unit. Transmission of the measurement signals occurs in a contactless manner by the rotor antenna sending the measurement signals to the stator antenna. The transmission frequency of 13.56 MHz in the Industrial Scientific and Medical (ISM) band is used for this purpose, and a data transmission rate of up to 1.4 Mbitsec$^{-1}$ is achieved.

For the operation of the strain gauges and the rotor antenna, the rotor unit must be supplied with electrical power. The stator unit comprises a primary coil, and the rotor unit comprises a secondary coil for this purpose. The primary and secondary coils are inductively coupled to one another. A primary electrical voltage in the primary coil generates a secondary electrical voltage in the secondary coil. Inductive coupling of the primary and secondary coils occurs in a contactless manner in the ISM band with carrier frequencies in the range of 115 kHz to 130 kHz.

The dipole magnets consist of a magnetized mixture of ferrite powder/rubber. With less than 200 mT, the remanence of the dipole magnets is relatively weak. A remanence being that weak is easily disturbed by external magnetic fields which may, thus, falsify the determination of the angle of rotation.

To achieve inductive coupling, the secondary coil comprises an iron powder/resin mixture. The iron powder/resin mixture can be mixed quickly and applied easily to the rotor unit in a curved shape using a spatula where it rapidly hardens. In particular, the same iron powder/resin mixture may be used for rotor units having different radii of curvature. Thus, the use of the iron powder/resin mixture leads to cost-effective production with high variability. However, the freshly mixed iron powder/resin mixture contains air inclusions, which persist even until after the iron powder/resin mixture has cured and result in a low magnetic permeability. As a consequence, the inductive coupling between the primary coil and the secondary coil has a low efficiency.

For the reasons mentioned above, the dipole magnets and the magnetic field sensor as well as the primary and secondary coils must be arranged in close proximity to each other. The radial air gap between the stator unit and the rotor unit is only 1.0 mm in width and must comply with a tight tolerance range for the radial air gap of +/−0.5 mm. To comply with this narrow tolerance range for the radial air gap, the rotor unit is manufactured with a balance quality grade of G 2.5 according to DIN ISO 1940-1, which, however, makes the production of KiTorq complex and expensive.

In many cases, after the rotor unit has been attached to a rotating component, there is not enough space in the vicinity of the rotating component for mounting the stator unit adjacent to the rotor unit to arrange the magnetic field sensor in close proximity to the dipole magnets. However, the greater the distance between the magnetic field sensor and the dipole magnets is, then the more error-prone is the measurement of the magnetic fields of the dipole magnets by the magnetic field sensor so that the determination of the angle of rotation may be falsified.

OBJECTS AND SUMMARY OF THE INVENTION

It is a first object of the present invention to provide a torque and angle of rotation detection system comprising a rotor unit and a stator unit that are separated from one another by a radial air gap with respect to an axis of rotation. The air gap desirably is wider than that known from the prior art according to KiTorq and desirably has a broader tolerance range regarding its width than the prior art according to KiTorq.

It is a second object of the invention to suggest a torque and angle of rotation detection system for which the detection of the angle of rotation is not readily disturbed by external magnetic fields.

Furthermore, it is a third object of the invention to provide a torque and angle of rotation detection system that is less expensive to manufacture than the prior art according to KiTorq.

A fourth object of the present invention is to provide a torque and angle of rotation detection system in which the stator unit can be easily and quickly mounted adjacent to the rotor unit to arrange the magnetic field sensor in close proximity to the dipole magnets.

Each of these objects, as well as others, has been achieved by the features described herein.

The invention relates to a torque and angle of rotation detection system; comprising a rotor unit which is able to rotate about an axis of rotation; comprising a stator unit arranged in a stationary manner and separated from the rotor unit by an air gap that is radial with respect to the axis of rotation; wherein the rotor unit comprises strain gauges which detect a torque acting onto the rotor unit; wherein the rotor unit comprises a plurality of dipole magnets arranged spaced apart from each other; wherein the stator unit comprises a magnetic field sensor which measures the magnetic fields of the dipole magnets during rotation of the rotor unit; wherein the stator unit comprises a primary coil and the rotor unit comprises a secondary coil; wherein a primary electrical voltage in the primary coil generates a secondary electrical voltage in the secondary coil; wherein each of the dipole magnets has a remanence of more than or equal to 1,000 mT, preferably of more than or equal to 1,400 mT; and wherein the secondary coil comprises a plurality of ferrite elements.

According to the invention, the dipole magnets of the rotor assembly have a strong remanence. The remanence of the dipole magnets according to the invention is at least five times higher as compared to that of the magnetized ferrite powder/rubber mixture of the dipole magnets according to KiTorq. It is this strong remanence that enables the measurement of the magnetic fields of the dipole magnets by the magnetic field sensor of the stator unit to be carried out from a greater distance. Moreover, since the remanence is that strong it is not easily disturbed by external magnetic fields.

Ferrite elements consist of very pure iron-oxygen compounds pressed into uniform pellets at high pressure. Therefore, ferrite elements are characterized by containing a large proportion of magnetic material and are highly compacted. This is the reason why ferrite elements have a high permeability. Furthermore, ferrite elements achieve an improved efficiency of inductive coupling between the primary and secondary coils as compared to that of the iron powder/resin mixture according to KiTorq. Due to the improved efficiency, inductive coupling can occur over a greater distance.

Thus, the combination of dipole magnets having a strong remanence and ferrite elements in the secondary coil of the system according to the invention has the synergistic effect that it is possible to increase the radial air gap between the rotor unit and the stator unit and that it is further possible to increase the tolerance range for the permissible width of the radial air gap.

In addition, ferrite elements are inexpensive to purchase making the manufacture of the system cost-effective.

In a presently preferred embodiment of the system, the width of the radial air gap is more than/equal to 2.0 mm with a tolerance range for the radial air gap of +/−1.5 mm.

Here, the radial air gap is at least twice the size and its allowable radial air gap tolerance range is even three times as large compared to the torque and rotation angle sensing system of the prior art according to KiTorq.

In a presently preferred embodiment of the system, the rotor unit comprises a rotor body and a plurality of blind holes, which blind holes are provided on the outside of the rotor body, and wherein the ferrite elements are secured in the blind holes.

This securing of the ferrite elements in blind holes is easy to accomplish which makes the manufacture of the system cost-effective.

In a presently preferred embodiment of the system, the securing of the ferrite elements in the blind holes is achieved by a form-locking connection.

In a presently preferred embodiment of the system, each blind hole comprises an interior space, which interior space comprises at least one inner surface; wherein each ferrite element comprises at least one outer surface; and wherein the inner surface and the outer surface are machined to match one another in size and a mechanical contact of the inner and outer surfaces results in a form-locking connection.

The form-locking connection ensures that the ferrite elements do not become detached from the rotor body even under a high centrifugal force of 20000 min$^{-1}$ and more. This form-locking connection is easy to accomplish and makes the manufacture of the system cost-effective.

In a presently preferred embodiment of the system, the rotor unit comprises a coil winding, which coil winding is attached radially to the outside of the ferrite elements.

This attachment of the coil winding radially to the outside of the ferrite elements is also easy to accomplish which makes the manufacture of the system cost-effective.

In a presently preferred embodiment of the system, the dipole magnets are made of neodymium-iron-boron.

Dipole magnets made of neodymium-iron-boron are inexpensive to purchase which also makes the manufacture of the system cost-effective.

In a presently preferred embodiment of the system, the rotor unit comprises a rotor body and a groove, which groove is arranged radially in the outside of the rotor body; and wherein the dipole magnets are secured within the groove.

This groove is easily fabricated in the rotor body. In this way, the dipole magnets secured in the groove are arranged at substantially the same radial distance from the axis of rotation as the coil winding so that it is possible to cover the dipole magnets and coil winding by a rotor cover of simple design. Thus, the groove contributes to making the manufacture of the system cost-effective.

In a presently preferred embodiment of the system, the rotor unit comprises a rotor cover, which rotor cover is attached radially to the outside of the rotor unit.

In a presently preferred embodiment of the system, the rotor cover is attached to the rotor unit by a force-locking connection.

In a presently preferred embodiment of the system, the rotor cover is clamped onto the rotor unit.

In a presently preferred embodiment of the system, the rotor unit comprises a coil winding; and in that the rotor cover clamped onto the rotor unit completely covers the coil winding and the dipole magnets.

This rotor cover protects the dipole magnets and the coil winding from mechanical damage. This rotor cover can be easily attached to the rotor unit and makes the manufacture of the system cost-effective.

In a presently preferred embodiment of the system, the stator unit is arranged along the axis of rotation with an axial offset tolerance in the range of +/−1.0 mm relative to the rotor unit.

The axial offset tolerance corresponds to an axial degree of freedom when the stator unit is mounted adjacent to the rotor unit. The measurement of the magnetic fields of the dipole magnets by the magnetic field sensor is not disturbed when complying with this axial offset tolerance. Due to this axial degree of freedom the stator unit can be mounted adjacent to the rotor unit in an easy and quick manner.

In a presently preferred embodiment of the system, the magnetic field sensor generates a magnetic field signal for each magnetic field measured; wherein the stator unit comprises an evaluation unit, which evaluation unit executes an evaluation program; wherein the magnetic field sensor transmits the magnetic field signals to the evaluation unit; and wherein the evaluation program counts the magnetic field signals and multiplies them by the distance of the dipole magnets from each other to determine the angle of rotation that has been traveled by the rotor unit.

In a presently preferred embodiment of the system, the strain gauges generate measurement signals for a detected torque; wherein the rotor unit comprises a rotor antenna; wherein the strain gauges transmit the measurement signals to the rotor antenna; wherein the stator unit comprises a stator antenna and an evaluation unit, which evaluation unit executes an evaluation program; wherein the rotor antenna sends the measurement signals to the stator antenna; wherein the stator antenna transmits the measurement signals received from the rotor antenna to the evaluation unit; and wherein the evaluation program determines the torque that acts onto the rotor unit from the transmitted measurement signals.

BRIEF DESCRIPTION OF THE SEVERAL VIEWS OF EXEMPLARY DRAWINGS

In the following, the invention will be explained in more detail by way of example with reference to the figures in which:

FIG. 1 shows a view of a portion of a torque and angle of rotation detection system 1 comprising a rotor unit 10 and a stator unit 20;

Figures 1, 2, 3:
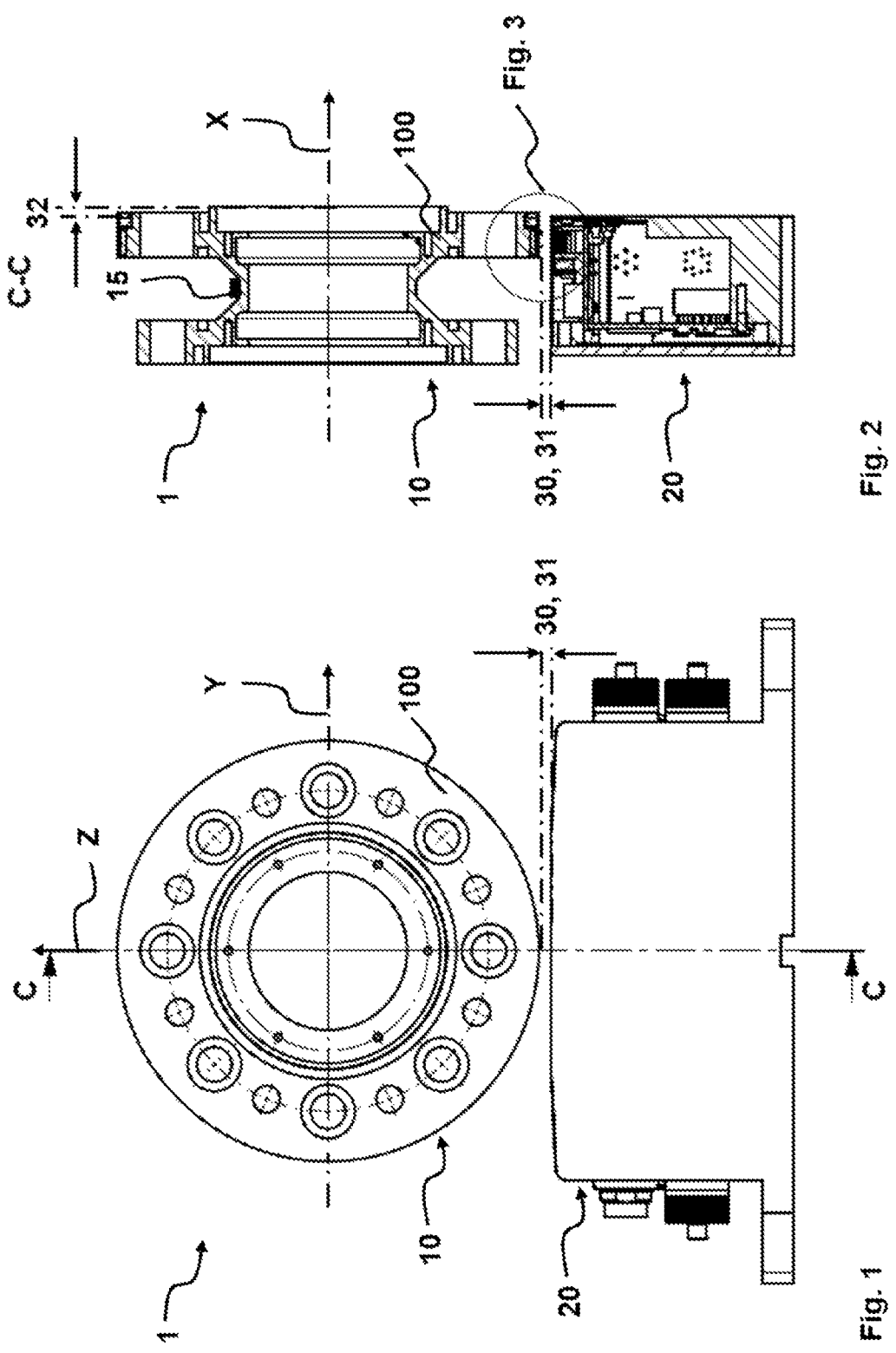
FIG. 2 shows a view looking in the direction of the arrows pointing at portion of the system 1 according to FIG. 1 in section along dashed line C-C.
FIG. 3 shows an enlarged cross-sectional view of the portion of the system 1 according to FIG. 2.
Figure 3:
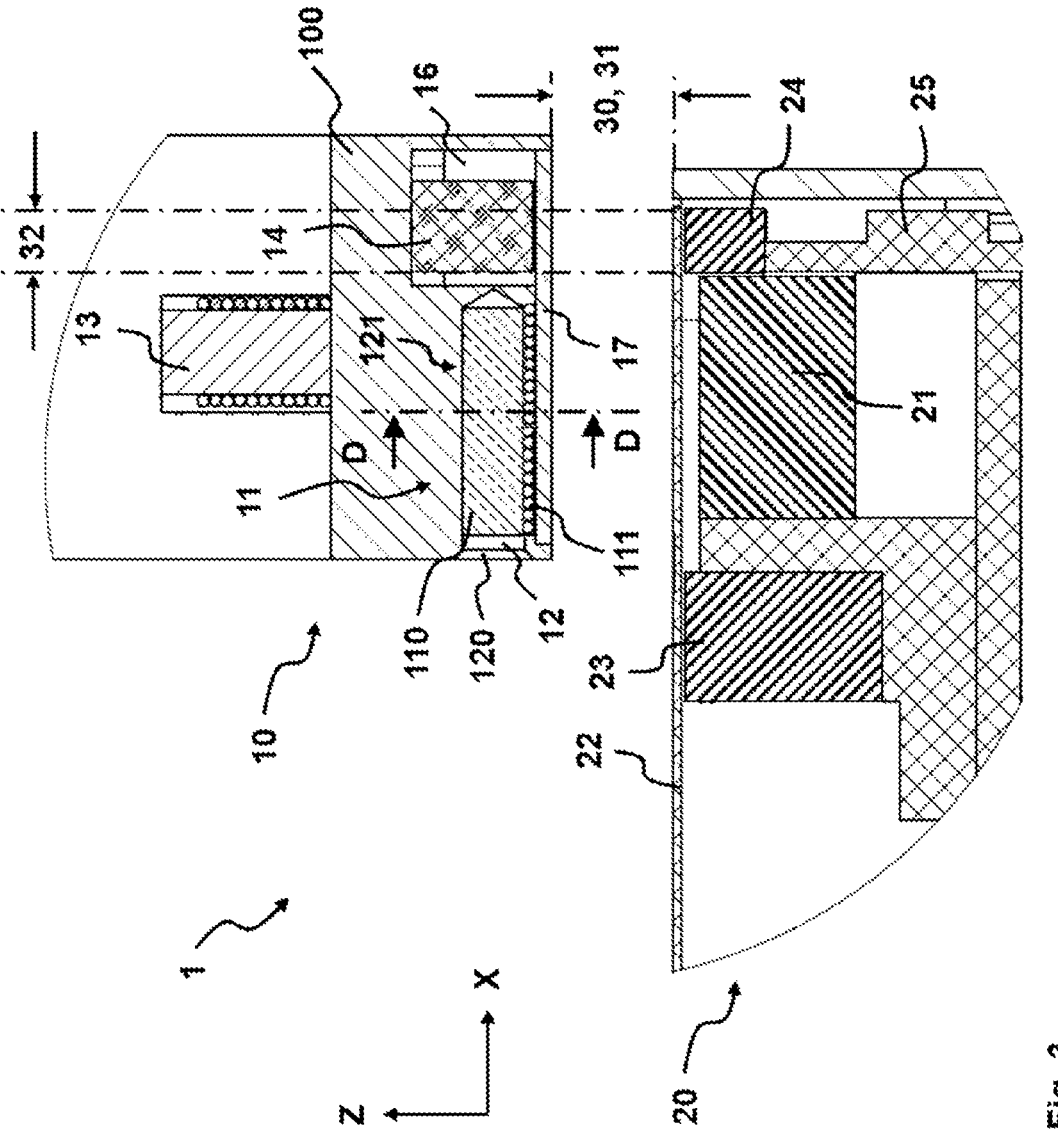
Figure 4:
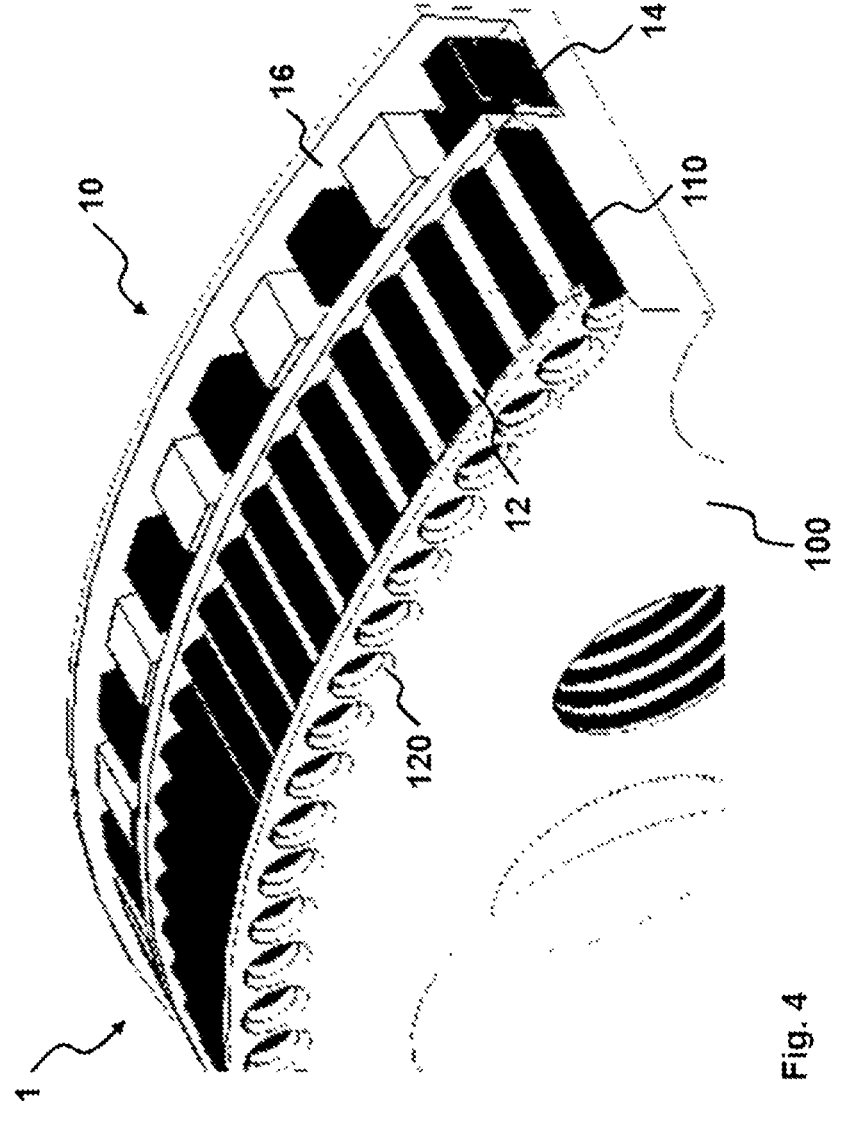
Figure 5:
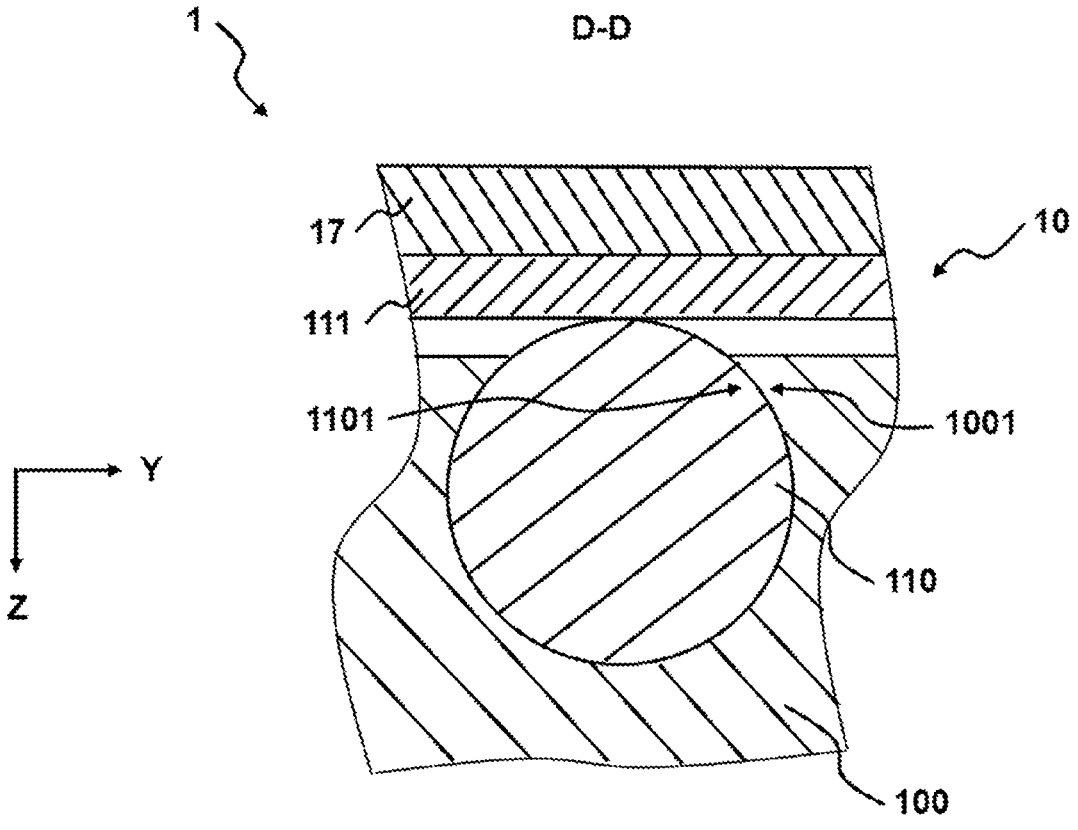

FIG. 4 shows an enlarged view of a portion of the rotor unit 10 according to FIGS. 1 and 2; and FIG. 5 shows an enlarged cross-sectional view looking in the direction of the arrows pointing at a portion of the rotor unit 10 according to FIG. 3 along chain-dashed line D-D.

DETAILED DESCRIPTION OF EXEMPLARY EMBODIMENTS OF THE INVENTION

FIG. 1 shows a view of a portion of the torque and angle of rotation detection system that is designated generally by the numeral 1. FIG. 2 is a representation of the view according to FIG. 1 in section along line C-C. FIG. 3 is an enlarged cross-sectional view of a portion of the system 1 as shown in FIG. 2. FIG. 4 is an enlarged view of a portion of the rotor unit 10 as shown in FIGS. 1 and 2. In addition, FIG. 5 is an enlarged cross-sectional view of a portion of the rotor unit 10 according to FIG. 3 along line D-D. The same reference numerals designate the same features in the figures.

System 1 is represented in a three-dimensional coordinate system comprising a rotational axis X, which is normal to the plane in which FIG. 1 lies, a horizontal axis Y, and a vertical axis Z. The three axes are perpendicular to each other.

System 1 comprises a rotor unit that is designated generally by the numeral 10 and a stator unit that is designated generally by the numeral 20.

The rotor unit 10 comprises a rotor body 100 that is hollow-cylindrical in shape. The rotor body 100 is made of a mechanically resistant material such as steel, stainless steel, and the like. The rotor unit 10 is designed as a flange which can be attached to any rotating component by means of a screw connection. The rotor unit 10 is configured for rotational speeds of 20000 $min^{-1}$ and higher.

The stator unit 20 is disposed in a stationary manner. As schematically shown in FIG. 1, the nearest surface of the stator 20 is separated from the surface of the outermost peripheral edge of the rotor unit 10 by a radial air gap 30 with respect to the axis of rotation X. The width of the radial air gap 30 is more than/equal to 2.0 mm, and a tolerance 31 for the radial air gap is in the range of +/−1.5 mm. Regardless of this, as schematically shown in FIG. 2, there is an axial offset tolerance 32 for an offset relative to the rotor unit 10 along the axis of rotation X. The axial offset tolerance 32 is in the range of +/−1.0 mm.

The rotor unit 10 comprises strain gauges 15 schematically shown in FIG. 2. The strain gauges 15 comprise a measurement grid and a bridge circuit. When an electrical voltage is applied to the measurement grid, the measurement grid exhibits an electrical resistance. The electrical resistance changes upon expansion or compression of the measurement grid, which change in electrical resistance generates measurement signals in the bridge circuit. The strain gauges 15 detect torque in a dynamic manner generating up to 10,000 measurement signals per second at a sampling rate of up to 35 kSample. The measurement signals have a resolution of 24 bits. The strain gauges 15 detect a maximum nominal torque of 100 Nm and more with an accuracy of within 0.05%.

As schematically shown in FIG. 3, the rotor unit 10 further comprises a rotor antenna 13 and the stator unit 20 comprises a stator antenna 23. The strain gauges 15 and the rotor antenna 13 are electrically connected to each other by electrical connecting lines. The strain gauges 15 transmit the measurement signals to the rotor antenna 13 via the electrical connecting lines. The measurement signals are transmitted from the rotor unit 10 to the stator unit 20 in a contactless manner. For this purpose, the rotor antenna 13 sends the measurement signals to the stator antenna 23. In a presently preferred embodiment, the transmission frequency of 13.56 MHz in the Industrial Scientific and Medical (ISM) band is used and a data transmission rate of up to 1.4 $Mbitsec^{-1}$ is achieved.

As schematically shown in FIG. 3, the rotor unit 10 comprises a secondary coil 11 and the stator unit 20 comprises a primary coil 21. The primary coil 21 and the secondary coil 11 are inductively coupled to each other. A primary electrical voltage in the primary coil 21 generates a secondary electrical voltage in the secondary coil 11. By inductive coupling, the stator unit 20 supplies electrical power to the rotor unit 10. Inductive coupling between the primary coil 21 and the secondary coil 11 is contactless and occurs in the ISM band with carrier frequencies in the range of 115 kHz to 130 kHz.

The secondary coil 11 and the strain gauges 15 are electrically connected to each other by electrical connecting lines. The secondary coil 11 supplies electrical power to the strain gauges 15 via the electrical connecting lines. The secondary coil 11 and the rotor antenna 13 are electrically connected to each other by electrical connecting lines. The secondary coil 11 supplies electrical power to the rotor antenna 13 via the electrical connecting lines.

As schematically shown in FIG. 3, the body 100 of the rotor unit 10 defines a plurality of blind holes 12. The blind holes 12 are disposed radially in the outside of the rotor body 100. The blind holes 12 are arranged on a circumference at a constant radial distance from the axis of rotation X. In a presently preferred embodiment, each blind hole 12 is defined by a blind hole opening 120 disposed opposite the blind end of the blind hole 12 and defining an entrance permitting access into the blind hole 12. The blind hole opening 120 is configured and disposed to lie in a plane disposed normal to the axis of rotation X in the rotor body 100. Each blind hole 12 defines an interior space 121 that elongates between the blind hole opening 120 and the closed blind end of the blind hole 12. The interior space 121 may be accessed from the outside of the rotor unit 10 through the blind hole opening 120.

As schematically shown in FIG. 3, the secondary coil 11 comprises a plurality of ferrite elements 110. The ferrite elements 110 desirably are manganese-zinc ferrites, nickel-zinc ferrites, and the like. In a presently preferred embodiment, the ferrite elements 110 are made from 3C90 material. The 3C90 material grade exhibits an initial magnetic permeability of more than/equal to 2,000, and in a presently preferred embodiment of more than/equal to 2,300. The initial magnetic permeability is determined in accordance with standard DIN IEC 60401, at a room temperature of 25° C., with a low electric current frequency of less than or equal to 10 kHz and a low peak magnetic flux of less than 0.25 mT. The initial magnetic permeability shows a scatter of +/−20%. For carrier frequencies in the range of 115 kHz to 130 kHz, 3C90 material exhibits low eddy current losses in the range of 165 kWm$^{-3}$ to 205 kWm$^{-3}$. The eddy current loss is determined at a room temperature of 25° C. and a peak magnetic flux of 100 mT. In a presently preferred embodiment, the ferrite elements 110 are cylindrical in shape. It is presently preferred that each ferrite element 110 has a diameter of 2.0 mm and a length of 7.5 mm. In a presently preferred embodiment, the secondary coil 10 comprises one hundred ferrite elements 110. In a presently preferred embodiment, the distance separating adjacent ones of the ferrite elements 12 from each other is 3.7 mm.

The ferrite elements 110 are arranged on the circumference of the blind holes 12 at a constant distance from each other. The ferrite elements 110 are secured in the blind holes 12. One ferrite element 110 is secured in each blind hole 12. The ferrite element 110 is inserted in the interior space 121 through the blind hole opening 120. The ferrite elements 110 are secured in the blind holes 12 by a form-locking connection such as engaging mechanically by a snap-in, click-in and the like, or by a material bond such as adhesive bonding and the like, or by a force-locking connection such as clamping and the like, or by any combination of a form-locking connection, a material bond and a force-locking connection. In a presently preferred embodiment, and as schematically shown in FIG. 5, the interior space 121 of each blind hole 12 is defined by at least one inner surface 1001 and the ferrite element 110 is defined by at least one outer surface 1101, which complements the shape of the opposing inner surface 1001 of the blind hole 12. The inner surface 1001 and the outer surface 1101 are machined to match each other, and a mechanical contact of the inner surface 1001 and the outer surface 1101 results in a form-locking connection. Thus, when the rotor unit 10 rotates at rotational speeds of 20000 min$^{-1}$ and higher and a centrifugal force acts onto the ferrite elements 11, the ferrite element 11 will not become detached from the rotor body 100 since the form-locking connection prevents separation of the ferrite element 11 from the rotor body 100.

As schematically shown in FIG. 3, the rotor unit 10 comprises a coil winding 111. The coil winding 111 is attached radially to the outside of the ferrite elements 110. The coil winding 111 is arranged on a circumference at a constant radial distance from the axis of rotation X. The coil winding 111 consists of wires made of an electrically conductive material such as copper, and the like. Advantageously, the wires have a circular cross-sectional shape and are 0.4 mm in diameter.

The rotor unit 10 comprises a groove 16. Groove 16 is defined radially in the outside of the rotor body 100. Groove 16 is arranged on a circumference at a constant radial distance from the axis of rotation X.

The rotor unit 10 comprises a plurality of dipole magnets 14 having a remanence of at least 1,000 mT, preferably of at least 1,400 mT. In a presently preferred embodiment, the dipole magnets 14 are made of neodymium-iron-boron. In a presently preferred embodiment, the dipole magnets 14 are secured in the groove 16. The dipole magnets 14 are secured by means of material bonding such as adhesive bonding and the like, or by a force-locking connection such as clamping and the like, or a combination of material bonding and a force-locking connection. The dipole magnets 14 are arranged at a constant distance from each other on the circumference of the groove 16. In a presently preferred embodiment, the rotor unit 10 comprises seventy-two dipole magnets 14. In a presently preferred embodiment, the distance between the dipole magnets 14 is 5.0 mm. It is presently preferred that the dipole magnets 14 are cuboidal in shape. In a presently preferred embodiment, the size of each dipole magnet 14 is 3.0×3.0×4.0 mm$^3$. Thus, each dipole magnet 14 desirably has an axial length of 3 mm along the axis of rotation X. This axial length of 3 mm allows for an axial degree of freedom when mounting the stator unit 20 adjacent to the rotor unit 10. The reason for this is that it is no longer necessary to mount the magnetic field sensor 24 of the stator unit 20 in close proximity to the dipole magnets 14, but rather it may be mounted with an axial offset tolerance 32 in the range of +/−1.0 mm without affecting the measurement of the magnetic fields of the dipole magnets 14 by the magnetic field sensor 24.

As schematically shown in FIG. 3, the rotor unit 10 comprises a rotor cover 17. The rotor cover 17 is attached radially to the outside of the rotor unit 10. The rotor cover 17 is attached to the rotor unit 10 by a force-locking connection such as clamping and the like. The rotor cover 17 is made of a material that has high tensile strength and rigidity such as carbon fiber reinforced plastic (CFRP), glass fiber reinforced plastic (GFRP), and the like. The rotor cover 17 is arranged on a circumference at a constant radial distance from the axis of rotation X. The rotor cover 17 is ribbon-shaped, which defines a long narrow strip that bends to conform to the outside of the rotor unit 10. Advantageously, the rotor cover 17 may be clamped onto the rotor unit 10 by elastic deformation. Advantageously, the rotor cover 17 clamped onto the rotor unit 10 completely covers the coil winding 111 and the dipole magnets 14. Advantageously, a radially outer end of the dipole magnets 14 is located at substantially the same radial distance from the axis of rotation X as radially outer ends of the coil winding 111. Thus, the rotor cover 17 clamped onto the rotor unit 10 is in direct mechanical surface contact on the outside in a radial direction with the coil winding 111 and in direct mechanical surface contact with the dipole magnets 14. The rotor cover 17 is configured and disposed to protect the coil winding 111 and the dipole magnets 14 from mechanical damage.

As schematically shown in FIG. 3, the stator unit 20 comprises a magnetic field sensor 24 that measures the magnetic fields of the dipole magnets 14 during rotation of the rotor unit 10. The magnetic field sensor 24 desirably is a Hall effect sensor, a magneto-resistive sensor and the like. For each magnetic field measured, the magnetic field sensor 24 generates a magnetic field signal. In a presently preferred embodiment, the magnetic field signal is a digital signal.

As schematically shown in FIG. 3, the stator unit 20 comprises an evaluation unit 25. The evaluation unit 25 desirably is an electrical circuit comprising at least one data processor and at least one data memory. The evaluation unit 25 comprises at least one evaluation program. The evaluation program is stored in the data memory and can be loaded from the data memory into the data processor. The evaluation unit 25 executes the evaluation program loaded into the data processor.

The stator antenna 23 and the evaluation unit 25 are electrically connected to each other by electrical connecting lines. The stator antenna 23 transmits the measurement signals received from the rotor antenna 13 to the evaluation unit 25 via the electrical connecting lines. The evaluation program loaded into the data processor is configured to calculate the torque that acts onto the rotor unit 10 from the transmitted measurement signals.

The magnetic field sensor 24 and the evaluation unit 25 are electrically connected to each other by electrical connecting lines. The magnetic field sensor 24 transmits the magnetic field signals to the evaluation unit 25 via the electrical connecting lines. The evaluation program loaded into the data processor is configured to count the magnetic field signals transmitted. The magnitude of the distance between the dipole magnets 14 is stored in the data memory. From the data memory, the evaluation program loaded into the data processor is configured to read the magnitude of the distance of the dipole magnets 14 from each other which the evaluation is configured to multiply by the number of magnetic field signals counted, thereby determining the angle of rotation traveled by the rotor unit 10.

The system 1 is useful in industrial measurement technology in a variety of ways. Thus, system 1 may be used for measuring the torque and the angle of rotation in test stand technology, for example. However, system 1 may also be used in chip-removing machining of workpieces for measuring the torque and the angle of rotation of rotating components.

LIST OF REFERENCE NUMERALS 1 system
10 rotor unit
11 secondary coil
100 rotor body
1001 inner surface
110 ferrite element
111 coil winding
1101 outer surface
12 blind hole
120 blind hole opening
121 interior space
13 rotor antenna
14 dipole magnet
15 strain gauge
16 groove
17 rotor cover
20 stator unit
21 primary coil 22 stator cover
23 stator antenna
24 magnetic field sensor
25 evaluation unit
30 radial air gap
31 radial air gap tolerance
32 axial offset tolerance
c-c section
d-d section
x rotational axis
y horizontal axis
z vertical axis

What is claimed is:

1. A torque and angle of rotation detection system, comprising:
   a rotor unit that is able to rotate about an axis of rotation;
   a stator unit arranged in a stationary manner and separated from the rotor unit by an air gap arranged radially with respect to the axis of rotation;
   wherein the rotor unit includes a plurality of strain gauges configured and disposed to detect a torque acting onto the rotor unit;
   wherein the rotor unit includes a secondary coil and a plurality of dipole magnets and each dipole magnet in the plurality of dipole magnets is arranged spaced apart from each other dipole magnet in the plurality of dipole magnets;
   wherein the stator unit includes a magnetic field sensor that is configured and disposed to measure magnetic fields of the dipole magnets during rotation of the rotor unit;
   wherein the stator unit includes a primary coil configured and disposed with respect to the secondary coil so that a primary electrical voltage in the primary coil generates a secondary electrical voltage in the secondary coil;
   wherein each of the dipole magnets in the plurality of dipole magnets has a remanence of at least 1,000 mT; and
   wherein the secondary coil includes a plurality of ferrite elements.

2. The system according to claim 1, wherein the air gap defines a width that measures at least 2.0 mm with a radial air gap tolerance that is in the range of +/−1.5 mm.

3. The system according to claim 1, wherein the rotor unit includes a rotor body that defines a plurality of blind holes; and wherein each of the ferrite elements in the plurality of ferrite elements is secured in a respective one of the blind holes of the plurality of blind holes.

4. The system according to claim 3, wherein a form-locking connection secures each ferrite element in each respective blind hole.

5. The system according to claim 4, wherein each blind hole of the plurality of blind holes defines at least one inner surface; wherein each ferrite element of the plurality of ferrite elements defines at least one outer surface; and wherein the at least one inner surface and the at least one outer surface are machined to match each other in size and a mechanical contact of the inner surface and the outer surface to produce a form-locking connection.

6. The system according to claim 1, wherein the stator unit is arranged with an axial offset tolerance in the range of +/−1.0 mm relative to the rotor unit along the axis of rotation.

7. The system according to claim 1, wherein the magnetic field sensor is configured to generate a magnetic field signal for each magnetic field measured; wherein the stator unit includes an evaluation unit that is configured to execute an evaluation program; wherein the magnetic field sensor is configured to transmit the magnetic field signals to the evaluation unit; and wherein the evaluation program is configured to count the magnetic field signals and to multiply each of the magnetic field signals by the distance between the dipole magnets in order to determine the angle of rotation traveled by the rotor unit.

8. The system according to claim 1, wherein each of the plurality of strain gauges is configured to generate measurement signals for a detected torque; wherein the rotor unit includes a rotor antenna; wherein each of the plurality of strain gauges is configured to transmit the measurement signals to the rotor antenna; wherein the stator unit includes a stator antenna and an evaluation unit, which evaluation unit includes an evaluation program and is configured to execute the evaluation program; wherein the rotor antenna is configured to send the measurement signals to the stator antenna; wherein the stator antenna is configured to transmit the measurement signals received from the rotor antenna to the evaluation unit; and wherein the evaluation program is configured to determine the torque that acts onto the rotor unit from the measurement signals transmitted.

9. The system according to claim 1, wherein each of the dipole magnets in the plurality of dipole magnets has a remanence of at least 1,400 mT.

10. A torque and angle of rotation detection system, comprising:
a rotor unit that is able to rotate about an axis of rotation;
a stator unit arranged in a stationary manner and separated from the rotor unit by an air gap arranged radially with respect to the axis of rotation;
wherein the rotor unit includes a plurality of strain gauges configured and disposed to detect a torque acting onto the rotor unit;
wherein the rotor unit includes a secondary coil and a plurality of dipole magnets and each dipole magnet in the plurality of dipole magnets is arranged spaced apart from each other dipole magnet in the plurality of dipole magnets;
wherein the stator unit includes a magnetic field sensor that is configured and disposed to measure magnetic fields of the dipole magnets during rotation of the rotor unit;
wherein the stator unit includes a primary coil configured and disposed with respect to the secondary coil so that a primary electrical voltage in the primary coil generates a secondary electrical voltage in the secondary coil;
wherein each of the dipole magnets in the plurality of dipole magnets has a remanence of at least 1,000 m;

wherein the secondary coil includes a plurality of ferrite elements; and
wherein the rotor unit includes a coil winding that is attached radially to the plurality of ferrite elements.

11. The system according to claim 10, wherein each of the dipole magnets in the plurality of dipole magnets is made of neodymium-iron-boron.

12. A torque and angle of rotation detection system, comprising:
a rotor unit that is able to rotate about an axis of rotation;
a stator unit arranged in a stationary manner and separated from the rotor unit by an air gap arranged radially with respect to the axis of rotation;
wherein the rotor unit includes a plurality of strain gauges configured and disposed to detect a torque acting onto the rotor unit;
wherein the rotor unit includes a secondary coil and a plurality of dipole magnets and each dipole magnet in the plurality of dipole magnets is arranged spaced apart from each other dipole magnet in the plurality of dipole magnets;
wherein the rotor unit includes a rotor body in which a groove is radially defined;
wherein each of the dipole magnets in the plurality of dipole magnets is secured within the groove;
wherein the stator unit includes a magnetic field sensor that is configured and disposed to measure magnetic fields of the dipole magnets during rotation of the rotor unit;
wherein the stator unit includes a primary coil configured and disposed with respect to the secondary coil so that a primary electrical voltage in the primary coil generates a secondary electrical voltage in the secondary coil;
wherein each of the dipole magnets in the plurality of dipole magnets has a remanence of at least 1,000 m; and
wherein the secondary coil includes a plurality of ferrite elements.

13. The system according to claim 12, wherein the rotor unit includes a rotor cover attached radially to the rotor unit.

14. The system according to claim 13, wherein the rotor cover is secured to the rotor unit by a force-locking connection.

15. The system according to claim 13, wherein the rotor cover is clamped onto the rotor unit.

16. The system according to claim 15, wherein the rotor unit includes a coil winding; and wherein the rotor cover clamped onto the rotor unit completely covers the coil winding and the plurality of dipole magnets.

* * * * *